Patented Aug. 18, 1931

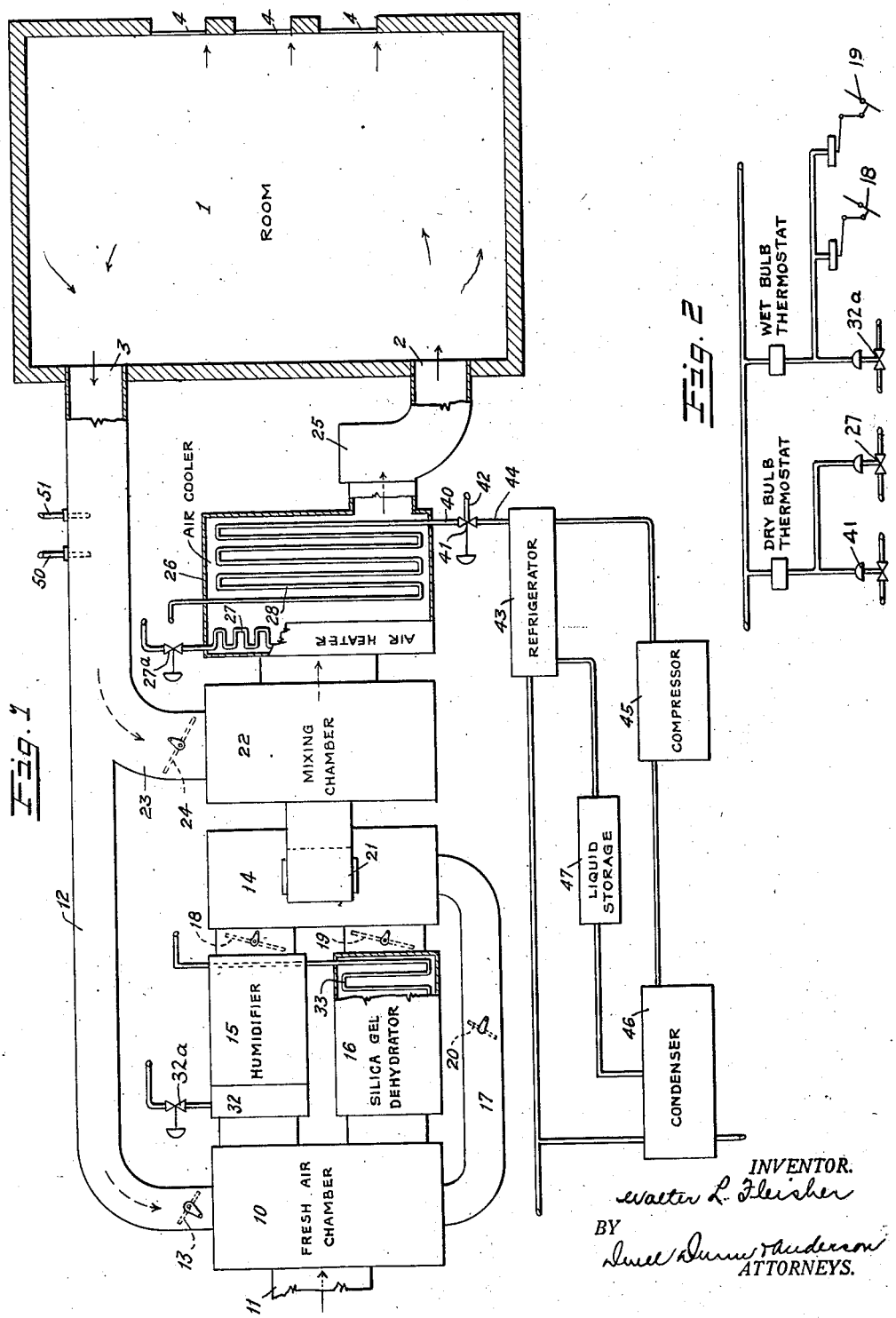

1,819,643

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

METHOD OF COOLING AND DRYING AIR

REISSUED

Application filed November 30, 1927. Serial No. 236,650.

This invention relates to ventilation and, more particularly, to ventilating systems in which it is desired to maintain within an enclosure a degree of humidity materially below saturation.

In humidity control by air washing systems, where dehumidification is required, it is necessary to bring the air into contact with the wash water at or below the dew point to be maintained, in order to effect the moisture extraction. This requires the bringing of the air from the dry bulb temperature to the dew point, as well as the extraction of the moisture and its heat content. This first is a waste of energy since the temperature must be subsequently raised in order to render the air suitable for ventilating purposes. This requires a considerable quantity of refrigeration, which does not represent useful work. With such a system, moreover, the refrigeration itself becomes expensive by reason of the fact that the heat units are extracted from the moisture at comparatively low temperature.

It is an object of this invention to produce a system in which satisfactory ventilating conditions may be readily maintained with an economy of refrigeration.

In certain classes of ventilation the problem is primarily one of dehumidification and cooling. This is particularly true of theatre ventilation where, during operation, even in the winter months, the heat and moisture given off by the occupants is, in itself, too great for comfort.

In a system in which dehumidification is effected by spraying the air with water, the air leaving the spray chamber is at a certain dew point having a quantity of moisture suitable to correct the room conditions. Where a sufficient quantity of water is available from an external source, of a temperature at or below the dew point to be maintained within the washer, the cooling and dehydrating may be effected without mechanical refrigeration. In general, however, it is desirable to condition intensively a portion of the air and subsequently dilute that conditioned air with unconditioned air. Where such a system is employed it necessitates that the spray chamber be maintained at a still lower temperature than where the air is all conditioned, and this requires a still lower temperature of the water supply.

In accordance with this invention it has been found that a silica compound designated as silica gel possesses the property of absorbing moisture from the air hygroscopically even though the latter be far from saturated, and without refrigeration. This makes it possible to extract the surplus moisture from the air without the necessity of lowering its temperature far below the ultimate temperature desired, so that the direct cooling effect upon the air may be confined to bringing the air to the desired sensible temperature after the proper quantity of moisture has been extracted.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

Fig. 1 is a diagrammatic plan of a ventilating system embodying this invention.

Fig. 2 is a diagram of the control apparatus embodied therein.

In the figures, the numeral 1 designates a room having an air inlet at 2 and outlet at 3. The room may be provided with windows as shown at 4 through which a portion of the air introduced may escape. The air conditioning and ventilating apparatus comprises generally a fresh air chamber 10 communicating with the outer air as shown at 11 and having a connection from the air outlet 3 of the room through the medium of a conduit 12 controlled by a damper 13.

From the fresh air chamber there are provided three pathways to a fan chamber 14 comprising a humidifier 15, a dehydrator 16 and a by-pass 17. These are each controlled by dampers designated as 18, 19 and 20, respectively. The fan chamber contains a fan 21 for introducing the air from the fan chamber into a mixing chamber 22 and a branch 23 from the conduit 12 serves to admit return air by way of the conduit 12 from the outlet 3 into the mixing chamber 22 under the control of a damper 24.

The air taken from the mixing chamber, is carried by a fan 25 through a tempering device 26 for introduction into the room through the inlet 2. This tempering device contains both a heater 27 and a cooling device 28. The heater is controlled by a valve 27ª.

This cooling device is preferably arranged on the countercurrent system, having a plurality of pipes so arranged in series that the fresh cooling liquid is introduced to encounter the already partly cooled air and thence passes on to encounter the uncooled air so that the coldest air encounters the coldest cooling liquid and the incoming or warmest air encounters the almost spent cooling liquid. This makes it possible to utilize the cooling effect for the maximum economy since it permits the delivery of air to the room substantially at the temperature of the cooling fluid. The cooling liquid may thence be discharged from the cooler 28. It is preferably thereafter passed through a cooler 33 directly associated with the dehydrator before going to waste or before returning for refrigeration as the case may be, as will be hereinafter described.

The cooler 28 is supplied with a cooling liquid by a conduit 40 under control of a three-way valve 41 which may supply liquid to the cooler, either from a natural supply through a pipe 42 or from a refrigerator 43 through a conduit 44. This refrigerator may be operated through any suitable refrigerating machinery including, for example, a compresser 45, a condenser 46, and a liquid storage tank 47.

Suitable wet and dry bulb thermostats 50 and 51 may be provided in the return air duct 12 to control the operation of the device automatically. For the purpose of effecting a further control over the humidity and temperature, and to obtain that control with the greatest efficiency, there is associated with the humidifier 15 a heater 32 in position to warm the air as it enters the humidifier and thereby enable it to take up a greater quantity of moisture. This heater will be particularly useful where the outside temperatures are very low. It may be controlled by a valve 32a.

The dehydrator 16 is arranged to expose the air to a large surface of silica gel which has the property of absorbing moisture from the air even at temperatures above the dew point. In so doing, however, the latent heat of the withdrawn moisture is given out as a sensible heat, raising the temperature of the gel and of the air. There is, therefore, preferably associated with the dehydrator a cooling coil 33 at the point in the system of the maximum temperature, that is immediately following the dehydrator itself. This cooler can most economically be placed in series with the cooler 28 to receive the cooling fluid which has already passed through the cooler 28, since in this manner the additional cooling effect obtained in the cooler 33 results in the discharge of the cooling fluid at a higher temperature without the necessity of additional refrigeration or additional cooling fluid.

The control apparatus for controlling the temperature under the influence of the wet and dry bulb temperatures may be varied to meet conditions desired. For example, as illustrated in Fig. 2, the dry bulb thermostat may be arranged to control the flow of cold water to the air cooler 28 by means of the valve 41 and to control the flow of steam to the air heater 27 by means of the valve 27a, so that as the dry bulb temperature rises, the heat from the heater is cut off and if this proves insufficient to lower the temperature, the cool water from the city supply may be introduced. If this be insufficient, refrigerated water may be used. The wet bulb thermostat may be used to control the proportions of air through silica gel cell and through the humidifier, increasing the proportions of the latter as the wet bulb temperature falls. This wet bulb thermostat may also be used to introduce steam into the tempering coil 32, if desired, as, for example, if the humidification from the humidifier acting upon the unheated air proves insufficient.

If desired, the dry bulb thermostat may also be caused to introduce large quantities of return air when needed, in order to increase the sensible heat to effect a saving in direct heating in the heater 32, and the wet bulb device may be caused to operate the damper 13 to introduce large quantities of return air through the humidifying system in order to effect a saving in the operation of the heater 32.

Since, in general, the ventilating problem in the summer time is one of dehumidification and requires humidification only under certain conditions in the winter time, for certain seasons of the year, the sprays within the humidifying chamber may be closed down and the chamber 15 itself used solely as a by-pass around the silica gel cell. Similarly, during other seasons of the year the silica gel may be omitted from the dehydrator and the dehydrating chamber itself used as a by-pass around the humidifier. With a system contemplating this as its sole method of operation, the additional by-pass 17 may be omitted.

Since, however, the humidifier when operated with cold water will act as a combined dehumidifier and cooler, and the silica gel cell operates as a dehumidifier and heater, it is obvious that the association of the two cells and the by-pass 17 permit an apportioning of the air between them which will control not only the moisture content of the air but also its physical temperature.

It will be understood that the water for the sprays and the humidifier 15 may be either from a natural supply if there be a sufficient supply of proper temperature, or may itself be taken from a refrigerating apparatus. For the sake of avoiding complexity in the drawings, these details have been omitted therefrom.

Since certain changes in carrying out the above process and in the construction set forth, which embody the invention, may be made without departing from its scope, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In combination, a chamber, a branched conduit for conducting air to said chamber, humidifying means in one of said branches and dehydrating means in the other of said branches, a mixing chamber into which each of said branches discharges, means for conducting return air from a room to said mixing chamber and means for adjusting the superheat of the air passing to the chamber.

2. The method of humidity control which comprises extracting moisture from a portion of the air above the dew point, adding moisture to another portion of the air, mingling both said portions with other air and controlling the temperature and moisture content of the air by regulating the said proportions.

3. The process of conditioning air which comprises apportioning the air between a refrigerating dehydrator and a hygroscopic dehydrator mixing the appointed air and adjusting the proportions of the mixture to control both temperature and humidity.

4. The process of conditioning air which comprises dehydrating a portion thereof by refrigeration, dehydrating a portion thereof hygroscopically, mingling the two portions with each other and with untreated air to control the temperature and humidity.

5. A method of conditioning air which includes withdrawing air from an enclosure, passing a certain amount of such air through a humidifier, passing another portion of the withdrawn air through a dehydrator, mixing the humidified and dehydrated air, injecting a further amount of air withdrawn from the enclosure into the resultant mixture, and introducing the complete mixture to the enclosure.

6. An apparatus of the character described including a dehydrating apparatus, cooling means arranged to the rear thereof, an enclosure formed with inlet and outlet openings, means providing a passageway extending from said outlet opening and connected to the intake end of said dehydrating apparatus, a by-pass in said passageway, and means providing a passageway connected to said cooling means, said by-pass and to the said enclosure whereby intake opening of said enclosure whereby withdrawn unconditioned air is injected into the dehydrated cooled air and the resultant mixture is introduced into said enclosure.

7. An apparatus of the character described including a dehydrating apparatus, cooling means arranged to the rear thereof, an enclosure formed with inlet and outlet openings, means providing a passageway extending from said outlet opening and connected to the intake end of said dehydrating apparatus, a by-pass in said passageway, means providing a passageway connected to said cooling means, said by-pass and to the intake opening of said enclosure whereby withdrawn unconditioned air is injected into the dehydrated cooled air and the resultant mixture is introduced into said enclosure, and means disposed within said last named passageway for controlling the sensible heat of the air flowing through the same.

8. An apparatus of the character described including, in combination, an enclosure formed with inlet and outlet openings, a passageway extending from said outlet opening, branches in communication with said passageway, a humidifying apparatus disposed within one of said branches, a dehydrating apparatus disposed within another of the same, a mixing chamber connected to the outlet ends of both of said passageways, means for circulating air through said apparatus and passageways, means providing a further passageway extending from said mixing chamber to the intake opening of said enclosure, and a by-pass extending from said first named passageway and in communication with said mixing chamber whereby to directly introduce untreated air into the mixture of humidified and dehydrated air.

In testimony whereof I affix my signature.

WALTER L. FLEISHER.